United States Patent Office 2,842,589
Patented July 8, 1958

2,842,589

PREPARATION OF METHIONIC ACID

John A. Crowder and Everett E. Gilbert, Morris Township, Morris County, N. J., assignors to Allied Chemical Corporation, New York, N. Y., a corporation of New York No Drawing. Application January 26, 1956
Serial No. 561,687

6 Claims. (Cl. 260—513)

This invention relates to the preparation of methionic acid, also known as methane disulfonic acid. It is particularly concerned with a non-catalytic reaction which produces high yield of the desired product.

Prior attempts to produce methionic acid in good yield of high purity have been unsatisfactory. Typically prior processes, which have been directed to preparation of this or similar compounds, have been characterized by use of undesirable, expensive, or difficultly handleable raw materials; by necessity for starting with gaseous reactants; by undesirable reaction conditions including high temperature (e. g. 450° C. or higher), high pressure (e. g. as high as 5000 p. s. i. g.), or extended times of reaction; by necessity for presence of catalysts, many of these being expensive, difficultly handleable, and requiring processing for separation thereof from the product; by use of inert diluent materials requiring special handling, recycle, or recovery techniques; and by the production of large proportions of attendant by-products with consequent lowering of the yield and purity of desired product methionic acid.

It is an object of this invention to prepare methionic acid in good yield of high purity under mild reaction conditions. Other objects of this invention will be apparent to those skilled-in-the-art on reading the following description.

Methane sulfonic acid, $CH_3SO_2OH$, one of the starting materials of this process, melts at 20° C. and boils at 122° C./1 mm. Hg. The pure compound has a specific gravity 25°/40° C. of 1.4844. This material is readily obtainable as from petroleum by-products. Typically it may be prepared by the oxidation of a mercaptan (e. g. methyl mercaptan, $CH_3SH$) with oxygen:

$$2CH_3SH + 3O_2 \rightarrow 2CH_3SO_2OH$$

Alternatively it may be formed from an alkyl disulfide (e. g. methyl disulfide $CH_3-S-S-CH_3$) by oxidation in the presence of water:

$$2CH_3SSCH_3 + 5O_2 + 2H_2O \rightarrow 4CH_3SO_2OH$$

Liquid sulfur trioxide is available in the form of "Sulfan" (a registered trademark of Allied Chemical and Dye Corp.). This product is substantially pure sulfur trioxide in liquid phase containing an inert inhibitor or stabilizer which permits maintenance of the material in liquid form at temperatures higher than its melting point. The liquid sulfur trioxide employed in this invention may be a liquid sulfur trioxide prepared in situ or obtained from external source and need not be that obtained under the trademark "Sulfan." The $SO_3$ can also be introduced in gaseous form, either by distillation from oleum, or in the form of sulfuric acid process "converter gas."

In accordance with certain aspects of this invention, methane sulfonic acid and sulfur trioxide are reacted in liquid phase under non-catalytic conditions at 100° C.–150° C. Typically the reaction may be conducted at atmospheric pressure although higher or lower pressures may be employed. The reaction proceeds according to the following equation:

$$CH_3SO_2OH + SO_3 \rightarrow CH_2(SO_2OH)_2$$

More specifically in the preferred conduct of the process, a body of liquid methane sulfonic acid is maintained within a reaction zone wherein the temperature may be controlled. Sulfur trioxide in liquid phase is then added to the methane sulfonic acid.

The sulfur trioxide may be added entirely at the beginning of the reaction or it may be added continuously during the course of the reaction. Preferably, however, it may be added as several aliquots, typically three, during the course of the reaction. The total amount of liquid sulfur trioxide added is preferably stoichiometrically equal to the methane sulfonic acid present originally.

When the liquid sulfur trioxide is added in one portion at the beginning of the reaction, reaction is effected to substantially theoretical extent by raising the temperature to at least 100° C. Although the temperature may be raised to as high as 150° C., this temperature should not be exceeded. Preferred maximum temperature is 145° C. The preferred range is 140° C.–145° C. and applies to methane sulfonic acid of good purity. With a less pure raw material, it is preferred to use a lower reaction temperature, e. g. 120° C.–130° C. The reaction mixture may be maintained at the desired temperature for 2 to 3, say 2.5 hours.

When the liquid sulfur trioxide is added in several aliquots, the mixture will be maintained by heating within the range of e. g. 100° C.–150° C., preferably 140° C.–145° C. as above described. Under these conditions, the reaction mixture may be maintained in the desired temperature range for 0.5 to 1, say 0.75 hour after each addition of liquid sulfur trioxide. Typically when that material is added in three equal increments, the time of heating at the preferred temperature of 140° C.–145° C. is one hour after each addition. The process may be operated continuously as well as batchwise.

Methionic acid may be obtained in high purity in yields approaching the stoichiometric. The product is characterized by substantial freedom from by-products or impurities. Salts may readily be formed by neutralizing the free acid with an appropriate chemical such as metal hydroxide, e. g. sodium hydroxide, or a metal carbonate, e. g. potassium carbonate. Alternatively certain of the salts, e. g. the potassium salt, may be formed by dissolving the acid in water and adding a precipitant, e. g. potassium chloride, the insoluble potassium methionate precipitating out.

The present invention is further illustrated with respect to specific embodiments thereof in the following illustrative examples which are exemplary and are not intended to restrict the limits of the process.

*Example I*

0.3 mol of liquid methane sulfonic acid were placed in a reaction vessel fitted with agitator, heater, reflux condenser, and liquid inlet. The agitator was started and 0.1 mol of liquid sulfur trioxide were admitted through the liquid inlet. External heating raised the temperature to 140° C.–145° C. for a period of one hour. A second and a third aliquot of liquid sulfur trioxide, each in amount of 0.1 mol, were added and the reaction mixture was heated for one hour to 140° C.–145° C. after each addition. The yield of methionic acid having a neutralization equivalent of 74.7 was 0.255 mol (85%). Product was a solid having a melting point of 96° C.–100° C.

Example II 0.3 mol of liquid methane sulfonic acid were placed in a reaction vessel fitted with agitator, heater, reflux condenser, and liquid inlet. The agitator was started and 0.3 mol of liquid sulfur trioxide were admitted through the liquid inlet. The mixture was then heated for three hours in the range 125° C.–145° C. The product methionic acid was a tan colored solid having a neutral equivalent of 84.5.

Although we have disclosed one embodiment of this invention, it will be apparent to those skilled-in-the-art that various modifications may be made in the process which fall within the scope of the invention.

We claim:

1. The method of preparing methionic acid which comprises reacting methane sulfonic acid with sulfur trioxide in liquid phase and in the absence of a catalyst at temperature of 100° C.–150° C.

2. The method of preparing methionic acid which comprises reacting methane sulfonic acid with sulfur trioxide in liquid phase and in the absence of a catalyst at temperature of 140° C.–145° C.

3. The method of preparing methionic acid which comprises reacting methane sulfonic acid with sulfur trioxide in liquid phase and in the absence of a catalyst at temperature of 100° C.–150° C. and at atmospheric pressure.

4. The method of preparing methionic acid which comprises adding liquid sulfur trioxide to a body of liquid methane sulfonic acid in the absence of a catalyst, and maintaining the temperature of reaction at 100° C.–150° C. by external heating.

5. The method of preparing methionic acid which comprises adding a plurality of aliquots of liquid sulfur trioxide to a body of liquid methane sulfonic acid in the absence of a catalyst, and maintaining the temperature of reaction at 100° C.–150° C. by external heating.

6. The method of preparing methionic acid which comprises reacting in liquid phase and in the absence of a catalyst equimolar amounts of methane sulfonic acid and sulfur trioxide at temperature of 100° C.–150° C.

References Cited in the file of this patent

UNITED STATES PATENTS 2,493,038    Snyder et al. _____ Jan. 3, 1950